US009903303B2

(12) United States Patent
Nogawa (10) Patent No.: US 9,903,303 B2
(45) Date of Patent: Feb. 27, 2018

(54) CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventor: Shinichiro Nogawa, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/278,769

(22) Filed: Sep. 28, 2016

(65) Prior Publication Data

US 2017/0089290 A1    Mar. 30, 2017

(30) Foreign Application Priority Data

Sep. 30, 2015 (JP) ................. 2015-194580

(51) Int. Cl.
*F02D 41/30* (2006.01)
*F02D 41/00* (2006.01)

(52) U.S. Cl.
CPC ..... *F02D 41/3029* (2013.01); *F02D 41/0002* (2013.01); *F02D 41/307* (2013.01); *F02D 2041/0015* (2013.01); *Y02T 10/42* (2013.01)

(58) Field of Classification Search
CPC .. F02D 41/30; F02D 41/3029; F02D 41/0002; F02D 41/307; F02D 41/00; F02D 41/0015; Y02T 10/42
See application file for complete search history.

(56) References Cited

U.S. PATENT DOCUMENTS

| 4,119,065 A * | 10/1978 | Noguchi | F02B 19/1066 123/262 |
| 6,283,088 B1 * | 9/2001 | Takagi | F02B 17/005 123/295 |
| 2016/0369735 A1 * | 12/2016 | Zhou | F01N 13/14 |

FOREIGN PATENT DOCUMENTS

| EP | 1136682 A2 | 9/2001 |
| JP | 2002-130016 A | 5/2002 |
| JP | 2005-180247 A | 7/2005 |

* cited by examiner

*Primary Examiner* — Hieu T Vo
(74) *Attorney, Agent, or Firm* — Andrews Kurth Kenyon LLP (57) ABSTRACT

A control apparatus for an internal combustion engine having an air flow control valve which changes intake air flow achieves the stratified lean combustion, in place of the homogeneous lean combustion, in a specific combustion stroke of a specific cylinder, when it switches the opening of the air flow control valve, if all of or a part of a specific intake stroke overlaps with a switching period of the air flow control valve, the specific combustion stroke following the specific intake stroke of the specific cylinder. As a result, even when the opening of the air flow control valve is changed, it is possible to make combustion stable. Thereby, the occurrence of torque fluctuation is suppressed.

3 Claims, 7 Drawing Sheets

CONTROL APPARATUS FOR INTERNAL COMBUSTION ENGINE

CROSS-REFERENCE TO RELATED APPLICATION

The present application claims priority to Japanese Patent Application No. 2015-194580 filed on Sep. 30, 2015, which is incorporated herein by reference in its entirety.

BACKGROUND

1. Field

The present disclosure relates to a control apparatus for an internal combustion engine which achieves homogeneous lean combustion while utilizing intake flow such as tumble and swirl.

2. Description of the Related Art

A control apparatus for an internal combustion engine which has an air flow control valve such as a tumble control valve and a swirl control valve positioned in an intake ports and which controls intake air flow generated in a cylinders according to combustion status is conventionally known (e.g., refer to Patent Literature 1, i.e., Japanese Patent Application Laid-Open (kokai) No. 2005-180247 (especially, refer to [0016], [0017] and claim 4)). A combustion mode to achieve stratified combustion and a combustion mode to achieve homogeneous combustion, etc. are mainly known as combustion modes. The homogeneous combustion is a combustion mode which makes air-fuel mixture dispersed homogeneously in a cylinder burn. The stratified combustion is a combustion mode which forms air-fuel mixture whose fuel concentration is rich in the vicinity of a spark plug and which makes the air-fuel mixture burn. Homogeneously combustion in the case where an air-fuel ratio of the air-fuel mixture is the theoretical air-fuel ratio is referred to as "homogeneous stoichiometric combustion." Further, in the case where the air-fuel ratio of air-fuel mixture in a cylinder is lean air-fuel ratio (i.e., air-fuel ratio which is greater than the theoretical air-fuel ratio), homogeneous combustion and stratified combustion are referred to as "homogeneous lean combustion" and "stratified lean combustion" respectively.

Specifically, apparatus disclosed in the Patent Literature 1 (hereinafter, referred to as a "conventional apparatus") is configured to change opening of a tumble control valve according to engine rotational speed and engine load in the case where a combustion mode is the homogeneous stoichiometric combustion. Thereby, it is possible to change flow speed of the tumble flow in a cylinder according to the engine rotational speed and the engine load. Thus, it is possible to keep combustion stability and combustion efficiency high during the homogeneous stoichiometric combustion.

SUMMARY

Incidentally, an internal combustion engine which achieves the homogeneous lean combustion in broad operational regions has been considered. In the case where air-fuel mixture burns in the homogeneous lean combustion, the same torque is gained as the case of the homogeneous stoichiometric combustion with less fuel injection amount, whereby it is possible to improve fuel efficiency. Further, in the case where air-fuel mixture burns in the homogeneous lean combustion, because very high temperature region seldom appears in a cylinder, amount of NOx which is generated in the cylinder is less than the case of the stratified lean combustion. Thus, it is possible to improve fuel efficiency without increase of NOx emission amount because it is possible to increase situations to achieve lean combustion. Meanwhile, so as to achieve the homogeneous lean combustion which has an advantage in the fuel efficiency and the emission as described above in broader operational regions (e.g. regions which are defined by the engine rotational speed and the engine load), it has been considered to utilize an air flow control valve.

Specifically, in a region where the engine rotational speed is low, intake flow is strengthened by means of closing the air flow control valve so as to promote stirring of air-fuel mixture in a cylinder. Thereby, it is possible to achieve the homogeneous lean combustion even in the case where the engine rotational speed is low. Meanwhile, in a region where the engine rotational speed is high, because flow speed of air flow into the cylinder is high, intake flow in the cylinder becomes strong. Thereby, if the air flow control valve is controlled to the closing side, air flow in the cylinder becomes too strong, whereby misfire occurs because flame kernel ignited by a spark of a spark plug cannot grow. In view of this, in a region where the engine rotational speed is high, intake flow is weakened by means of controlling the air flow control valve to the opening side. Thereby, it is possible to achieve the homogeneous lean combustion even in the case where the engine rotational speed is high. Thus, it is possible to generate intake flow in the cylinder appropriate to operational regions by means of changing the opening of the air flow control valve, to thereby expand operational regions where the homogeneous lean combustion is achieved.

However, in the case where the homogeneous lean combustion is achieved, a combustion state easily becomes unstable compared to the case the homogeneous stoichiometric combustion is achieved. Thus, in the case where the engine is operated by burning air-fuel mixture with the homogeneous lean combustion, when operational region changes and the opening of the air flow control valve is changed like a control executed by the conventional apparatus consequently, intake flow fluctuates widely until the intake flow becomes stable, whereby a combustion state becomes unstable. As a result, generated torque may fluctuate widely.

The present disclosure has been made in order to solve the above-described issue. That is, one of the objects of the present disclosure is to provide a control apparatus for a spark ignition internal combustion engine (hereinafter, referred to as a "present disclosure apparatus") which can suppress occurrence of wide torque fluctuation in the case where the opening of an air flow control valve is changed in operational region where the homogeneous lean combustion is achieved.

A spark ignition internal combustion engine (10) which the present disclosure apparatus is applied to comprises an air flow control valve (44) which changes intake air flow generated in a cylinder of the internal combustion engine by means of changing an opening thereof.

Figure 6:
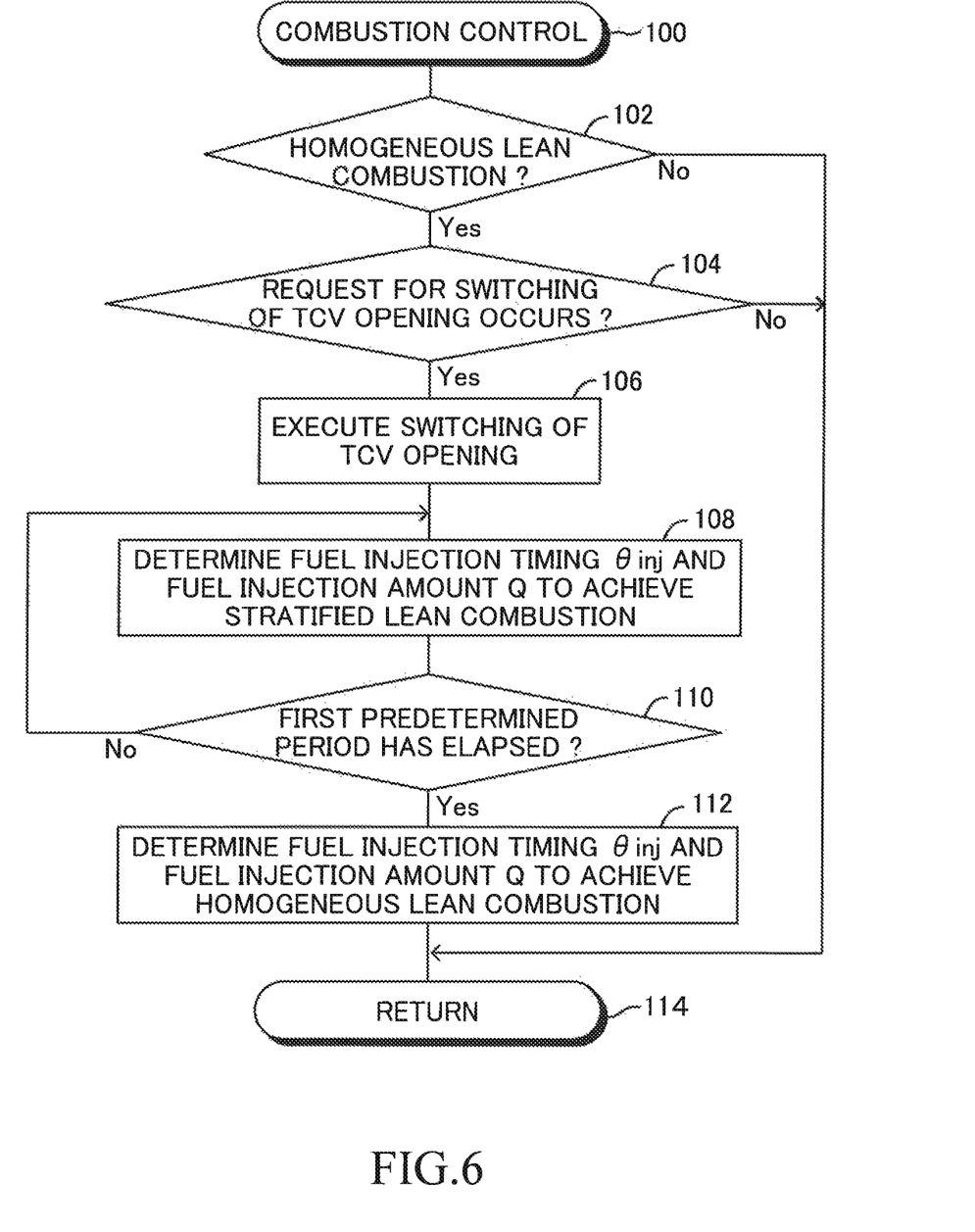
FIG. 6 is a flowchart showing a routine executed by a CPU of the first apparatus.
Figure 7:
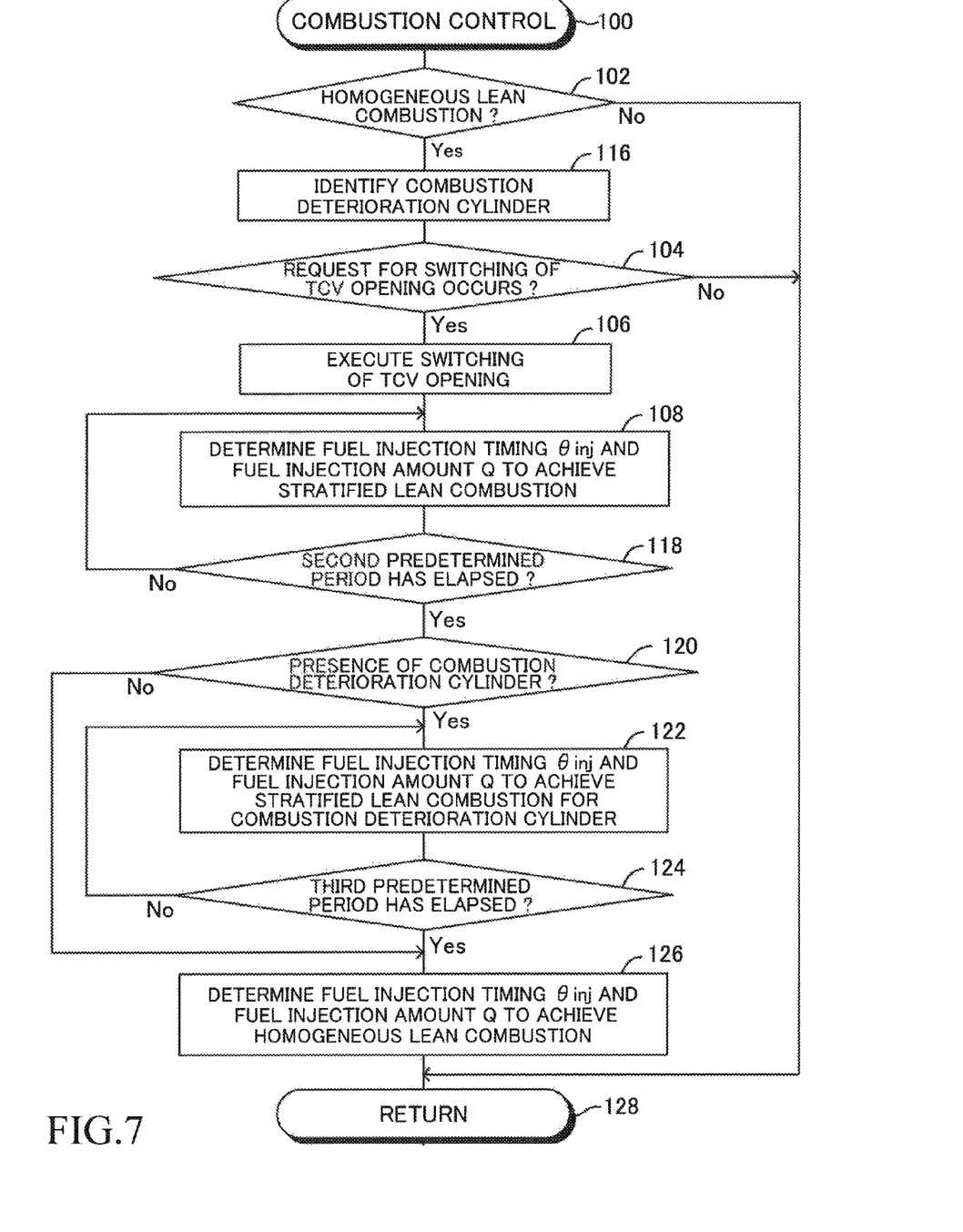
FIG. 7 is a flowchart showing a routine executed by a CPU of a control apparatus for an internal combustion engine according to a second embodiment of the present disclosure.

Further, the present disclosure apparatus comprises an opening control section (70, step 106 of FIG. 6 and FIG. 7) and a combustion control section (70, step 108 to step 112 of FIG. 6 and step 108 to step 126 of FIG. 7). The opening control section sets the opening of the air flow control valve to either a first opening or a second opening selectively. That is, the opening control section is configured to be able to switch the opening of the air flow control valve between the first opening and the second opening.

Additionally, the combustion control section controls the internal combustion engine so as to burn air-fuel mixture in the cylinder in either a homogeneous lean combustion mode or a stratified lean combustion mode, selectively.

Further, the combustion control section is configured to burn the air-fuel mixture in the homogeneous lean combustion mode when an operational point of the internal combustion engine is in an operational region where a homogeneous lean combustion is to be achieved (step 112 of FIG. 6 and step 126 of FIG. 7). In addition, the combustion control section is configured to burn the air-fuel mixture in the stratified lean combustion mode, in place of the homogeneous lean combustion mode, in a first specific combustion stroke of a first specific cylinder, when the opening control section switches the opening of the air flow control valve from the first opening to the second opening while the operational point is in the operational region, if all of or a part of a first specific intake stroke which is a period in which an intake valve of the first specific cylinder is open overlaps with a switching period from a point in time at which the opening of the air flow control valve starts to change from the first opening to the second opening to a point in time at which the opening of the air flow control valve reaches the second opening, the first specific combustion stroke following the first specific intake stroke of the first specific cylinder (i.e., the first specific intake stroke and the first specific combustion stroke are in the same combustion stroke) (step 108 and step 110 of FIG. 6 and step 108 and step 118 of FIG. 7).

As for the stratified lean combustion, air-fuel mixture whose fuel concentration is rich in the vicinity of a spark plug is formed and the air-fuel mixture is ignited. Thereby, even when the intake flow changes as a result of switching of the opening of the air flow control valve, the ignitionability of the air-fuel mixture becomes excellent, because the air-fuel mixture whose fuel concentration is rich in the vicinity of the spark plug is formed. As a result, according to the present disclosure apparatus, in the operational region where the homogeneous lean combustion is achieved, even when the opening of the air flow control valve is changed, it is possible to make combustion stable. Thereby, it is possible to suppress the occurrence of the wide torque fluctuation.

Incidentally, the cylinder air amount flowing into the cylinder changes transiently for a while after a point in time at which the opening of the air flow control valve reaches the second opening. As a result, a combustion state may become unstable, whereby the torque may fluctuate, because actual cylinder air amount changes.

In view of this, in one mode of the present disclosure apparatus, the combustion control section is configured to burn the air-fuel mixture in the stratified lean combustion mode, in place of the homogeneous lean combustion mode, in a second specific combustion stroke of a second specific cylinder, if all of or a part of a second specific intake stroke which is a period in which an intake valve of the second specific cylinder is open overlaps with a transient period from an end point in time of the switching period to a point in time at which an amount of intake air flowing into the engine become stable while the operational point is in the operational region, the second specific combustion stroke following the second specific intake stroke of the second specific cylinder (i.e., the second specific intake stroke and the second specific combustion stroke are in the same combustion stroke).

Thereby, during the transient period until the cylinder air amount flowing into the cylinder becomes stable, the stratified lean combustion where air-fuel mixture whose fuel concentration is rich in the vicinity of a spark plug is formed is achieved. Thus, the ignitionability of the air-fuel mixture becomes excellent during the transient period. As a result, according to the above-described mode, it is possible to suppress the occurrence of the torque fluctuation because the combustion becomes stable during the transient period.

In another mode of the present disclosure apparatus, the internal combustion engine is a multi-cylinder internal combustion engine having a plurality of cylinders. In addition, the internal combustion engine comprises a plurality of cylinder pressure sensors (67) each of which corresponds to each of the cylinders and detects an in-cylinder pressure of each of the cylinders.

Further, the present disclosure apparatus comprises a cylinder identification section (step 116 of FIG. 7) which identifies a cylinder of the internal combustion engine whose combustion state has become deteriorating as an combustion deterioration cylinder based on the in-cylinder pressure detected by the cylinder pressure sensors.

In addition, the combustion control section is configured to burn the air-fuel mixture in the stratified lean combustion mode, in place of the homogeneous lean combustion mode, in a third specific combustion stroke of a third specific cylinder which is the combustion deterioration cylinder identified by the cylinder identification section, if all of or a part of a third specific intake stroke which is a period in which an intake valve of the third specific cylinder is open overlaps with a transient period from an end point in time of the switching period to a point in time at which an amount of intake air flowing into the engine become stable while the operational point is in the operational region, and the third specific combustion stroke following the third specific intake stroke of the third specific cylinder.

As described above, the cylinder air amount flowing into the cylinder changes transiently for a while after a point in time at which the opening of the air flow control valve reaches the second opening. In addition, combustion status of a cylinder whose combustion status has become deteriorating before the changing of the opening of the air flow control valve is highly likely to become much more deteriorating. In response, according to the above-described mode, it is possible to identify a cylinder whose combustion state becomes much deteriorating during the transient period by means of identifying a combustion deterioration cylinder before the switching of the opening of the air flow control valve to the second opening. Further, this mode of the present disclosure apparatus achieves the stratified lean combustion in the identified combustion deterioration cylinder. Thus, the combustion status of the cylinder is unlikely to unstable. As a result, according to the above-described mode, it is possible to suppress the occurrence of the torque fluctuation because the combustion becomes stable during the transient period.

In the above description, the terms and/or reference symbols used in embodiments described later are enclosed in parentheses and assigned to the components of the present disclosure corresponding to the embodiments for easier understanding of the present disclosure. However, the constituent elements of the present disclosure are not limited to the embodiments defined by the terms and/or reference symbols. Other objects, other features, and accompanying advantages of the present disclosure are easily understandable from the description of the embodiments of the present disclosure to be given with reference to the following drawings.

DESCRIPTION OF THE PREFERRED EMBODIMENTS

Each of control apparatuses for an internal combustion engine (hereinafter, referred to as "present control apparatuses") according to embodiments of the present disclosure will next be described with reference to the drawings.

First Embodiment

Figure 1:
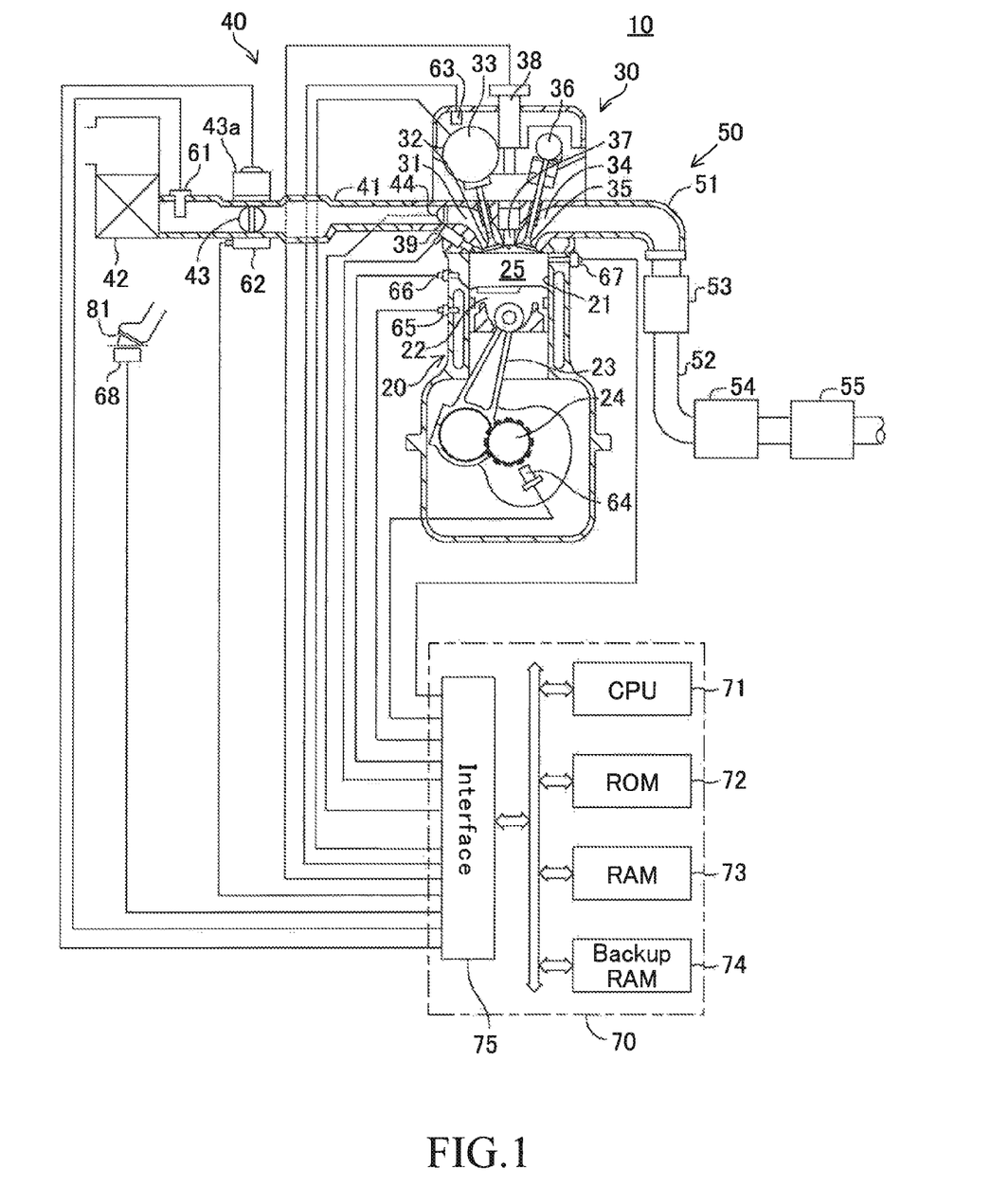
FIG. 1 is a schematic view of an internal combustion engine to which a control apparatus for an internal combustion engine (first apparatus) according to a first embodiment of the present disclosure is applied.

A control apparatus (hereinafter, simply referred to as a "first apparatus") according to the first embodiment of the present disclosure is applied to an internal combustion engine (hereinafter, simply referred to as a "engine") 10 shown in FIG. 1. The engine 10 is a cylinder injection type spark ignition, multi-cylinder (4 cylinders), gasoline internal combustion engine. The engine 10 is an internal combustion engine which can achieve the lean combustion operation (operation in the stratified lean combustion and the homogeneous lean combustion) which makes air-fuel mixture whose air-fuel ratio is greater than the theoretical air-fuel ratio (lean air-fuel ratio) burn stably. It should be noted that although the sectional view of a specific cylinder is shown in FIG. 1, the other cylinders have also similar constitution.

The engine 10 comprises cylinder block section 20 which contains a cylinder block, a cylinder block lower case and an oil pan, etc., a cylinder head 30 which is positioned above the cylinder block section 20, an intake system 40 which supplies air to the cylinder block section 20, and an exhaust system 50 which exhausts exhaust gas from the cylinder block section 20 to the outside.

The cylinder block section 20 contains a cylinder bore (cylinder) 21, a piston 22, a connecting rod 23 and a crankshaft 24. The piston 22 reciprocates in the cylinder 21 and the reciprocating motion of the piston 22 is transmitted to the crankshaft 24 via the connecting rod 23, thereby, the crankshaft 24 rotates. A top surface of the piston 22, a surface of the cylinder bore 21 and a bottom surface of the cylinder head 30 define a combustion chamber 25.

The cylinder head 30 is provided with an intake port 31 communicating with the combustion chamber 25, an intake valve 32 for opening and closing the intake port 31, an intake valve driving apparatus 33 containing an intake camshaft to drive the intake valve 32 for opening and closing, an exhaust port 34 communicating with the combustion chamber 25, an exhaust valve 35 for opening and closing the exhaust port 34, an exhaust camshaft 36 to drive the exhaust valve 35, a spark plug 37, an igniter 38 containing an ignition coil which generates high voltage to be supplied to the spark plug 37, and an fuel injection valve 39 (cylinder injection valve, fuel injector) injecting fuel directly into the combustion chamber 25. The first apparatus achieves the homogeneous lean combustion where fuel injected by the fuel injection valve 39 and air are homogeneously mixed, the spark plug 37 ignites the air-fuel mixture and the air-fuel mixture burns. The first apparatus also achieves the stratified lean combustion where stratified air-fuel mixture is formed by fuel injected by the fuel injection valve 39 (i.e. air-fuel mixture contains portions whose fuel concentration is rich and portions whose fuel concentration is lean), and the spark plug 37 ignites the air-fuel mixture when a portion of the air-fuel mixture whose fuel concentration is rich reaches the vicinity of the spark plug 37, and then, the air-fuel mixture burns.

The intake system 40 is provided with an intake pipe 41 communicating with the intake port 31, containing an intake manifold and forming an intake passage with the intake port 31, an air filter 42 positioned at the edge of the intake pipe 41, a throttle valve 43 within the intake pipe 41 changing a passage cross-sectional area of the intake passage, and a throttle valve actuator 43a having a DC motor which drives the throttle valve 43 and which constitutes a throttle valve drive means.

Further, the intake system 40 is provided with a tumble control valves (hereinafter, referred to as a "TCV") 44 and "a valve shaft and a TCV actuator having a DC motor (not shown) driving the TCVs 44 which constitutes a TCV drive means." All of the TCVs 44 are positioned on the single valve shaft. The valve shaft is mounted rotatably to the intake port 31 and the valve shaft is rotatably driven by the TCV actuator. When the TCV actuator rotates the valve shaft, the openings of all of the TCVs 44 are switched from the open (a first opening) to the close (a second opening) or are switched from the close to the open at the same time.

The exhaust system 50 is provided with an exhaust manifold 51 communicating with the exhaust port 34, an exhaust pipe (exhaust tube) 52 connected to the exhaust manifold 51, a start catalyst (S/C) 53 which is a three-way catalyst, a NOx occluding and reducing catalyst (NSR) 54, and a selective reduction type catalyst (SCR) 55. There are disposed in the order of the S/C 53, the NSR 54, and the SCR 55 from the upstream side of the exhaust pipe 52.

The engine 10 also comprises a hot wire type air flow meter 61, a throttle opening sensor 62, a cam position sensor 63, a crank position sensor 64, a cooling water temperature sensor 65, a cylinder pressure sensor 67, and an accelerator position sensor 68.

The hot wire type air flow meter 61 detects a mass flow rate (an intake air flow rate) of the intake air flowing through the intake pipe 41 and outputs a signal representing a mass flow rate Ga.

The throttle opening sensor 62 detects the opening of the throttle valve 43 and outputs a signal representing a throttle valve opening TA.

The cam position sensor 63 outputs a single pulse when the intake camshaft rotates 90 degrees from a predetermined angle, when the intake camshaft rotates 90 degrees after that, and when the intake camshaft further rotates 180 degrees after that.

The crank position sensor 64 outputs a signal pulse generated every time the crankshaft 24 rotates 10 degrees. The signal pulse output from the crank position sensor 64 is converted to an engine rotational speed NE by an electric controller 70, which will be described later. Further, the electric controller 70 obtains a crank angle of the engine 10 (absolute crank angle θ) based on the signals from cam position sensor 63 and the crank position sensor 64.

The cooling water temperature sensor 65 detects a temperature of a cooling water of the engine 10, and outputs a signal representing the detected cooling water temperature THW.

Each of the cylinder pressure sensors 67 is disposed so as to correspond to each of the cylinders. Each of the cylinder pressure sensors 67 detects a pressure in the corresponding cylinder (that is, in-cylinder pressure, a pressure of gas in the corresponding combustion chamber 25), and output a signal representing an in-cylinder pressure P (=Pc). Each of the in-cylinder pressure P is obtained by the electric controller 70 every time the crank angle changes by a micro angle Δθ. Further, the obtained in-cylinder pressure P is sequentially stored in RAM 73, which will be described later, associated with the crank angle θ of the cylinder at which the in-cylinder pressure P is detected in a form of in-cylinder pressure P(θ) per cylinder.

The accelerator position sensor 68 detects an operation amount of an accelerator pedal 81 operated by a driver and outputs a signal representing an accelerator pedal operation amount Accp. The accelerator pedal operation amount Accp is one of parameters which represent load of the engine 10.

The electric controller 70 is a well-known microcomputer which contains a CPU 71, a ROM 72, a RAM 73, a backup RAM 74, and an interface 75 which includes an AD converter, etc.

The interface 75 is connected to the above described sensors 61-68 and supplies signals from these sensors to the CPU 71. Further, the interface 75 sends drive signals to the intake valve driving apparatus 33, the throttle valve actuator 43a and the TCV drive means, etc., sends injection instruction signals to the fuel injection valves 39 of each cylinder, and sends ignition signals to the igniters 38 of each cylinder, in response to instructions from the CPU 71.

(Switching of TCV Opening)

Switching of the opening of the TCV 44 executed by the first apparatus will next be described.

Figure 2:
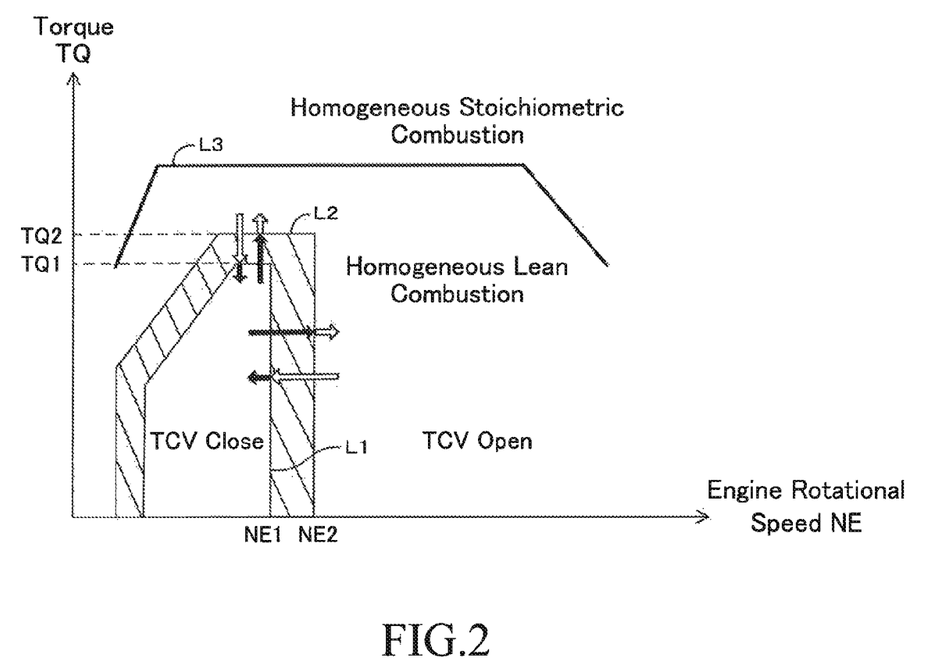
FIG. 2 is a graph showing the relationship between operational region and operational condition of a tumble control valve of the internal combustion engine shown in FIG. 1.

FIG. 2 is a figure which shows a relationship between an operational region of the engine 10 and a valve opening of the TCV 44. The operational region is divided by a combination of the engine rotational speed NE and a torque TQ generated by the engine 10 (which is corresponding to the engine load). In FIG. 2, the region marked "TCV open" is a region where the TCV 44 is constantly maintained in the open status (the opening of the TCV 44 is kept to be the first opening at all times) and the region marked "TCV close" is a region where the TCV 44 is constantly maintained in the close status (the opening of the TCV 44 is kept to be the second opening at all times). In FIG. 2, the black arrows represent that the TCV 44 is closed when the operational point of the engine 10 begins to move from the start point to the end point of the black arrows. The white arrows represent that the TCV 44 is opened when the operational point of the engine 10 begins to move from the start point to the end point of the white arrows.

In FIG. 2, the hatching region between the TCV open region and the TCV close region is so-called "hysteresis region." In the case where the TCV 44 is the close status, when the operational point of the engine 10 moves from the TCV close region to the TCV open region across line L1, the TCV 44 is closed in the hysteresis region. In the case where the TCV 44 is in the open status, when the operational point of the engine 10 moves from the TCV open region to the TCV close region across line L2, the TCV 44 is opened in the hysteresis region. In the case where the operational point of the engine 10 is in the TCV open region and the TCV 44 is opened, when the engine rotational speed NE decreases while the torque TQ remains constant, the TCV 44 is switched from the open status to the close status at a point in time at which the engine rotational speed NE is equal to a rotational speed NE1. In the case where the operational point of the engine 10 is in the TCV close region and the TCV 44 is closed, when the engine rotational speed NE increases while the torque TQ remains constant, the TCV 44 is switched from the close status to the open status at a point in time at which the engine rotational speed NE is equal to a rotational speed NE2. In the case where the operational point of the engine 10 is in the TCV open region and the TCV 44 is opened, when the torque TQ decreases while the engine rotational speed NE remains constant, the TCV 44 is switched from the open status to the close status at a point in time at which the torque TQ is equal to a torque TQ1. In the case where the operational point of the engine 10 is in the TCV close region and the TCV 44 is closed, when the torque TQ increases while the engine rotational speed NE remains constant, the TCV 44 is switched from the close status to the open status at a point in time at which the torque TQ is equal to a torque TQ2.

It should be noted that in FIG. 2, line L3, which is shown by the bold solid line, is a border line between a region where the homogeneous stoichiometric combustion is achieved and a region where the homogeneous lean combustion is achieved. Line L3 represents the maximum torque which can be realized by achieving the homogeneous lean combustion for each of the engine rotational speed NE. The region on the lower torque side from line L3 is a region where the homogeneous lean combustion is achieved. The region on the higher torque side from line L3 is a region where the homogeneous stoichiometric combustion is achieved. It should be noted that when the homogeneous lean combustion is achieved, the air-fuel ratio of the air-fuel mixture is large and around the misfire limit value (i.e. strong lean air-fuel ratio), and is about 26.5, for example.

As understood from "the relationship between the operational region and the opening of the TCV 44" shown in FIG. 2, the first apparatus switches the opening of the TCV 44 in the region where the homogeneous lean combustion is achieved. When the opening of the TCV 44 is switched, because intake flow in the cylinder changes widely, a combustion state may become unstable, whereby the torque TQ may fluctuate. In order to suppress this fluctuation of the torque TQ, it is effective that if a period when the intake flow is unstable as the result of switching of the opening of the TCV 44 overlaps all of or a part of intake stroke of a specific cylinder, the stratified lean combustion is achieved in the specific cylinder. When the stratified lean combustion is achieved, combustion of the air-fuel mixture may become stabler than when the homogeneous lean combustion is achieved, whereby the fluctuation of the torque TQ may be suppressed. In view of this, in the case where the operational point of the engine 10 is in the operational region where the homogeneous lean combustion is achieved, when the first apparatus switches the opening of the TCV 44, the first apparatus executes a combustion control, which will be described later.

(Overview of the Combustion Control)

Figure 3:
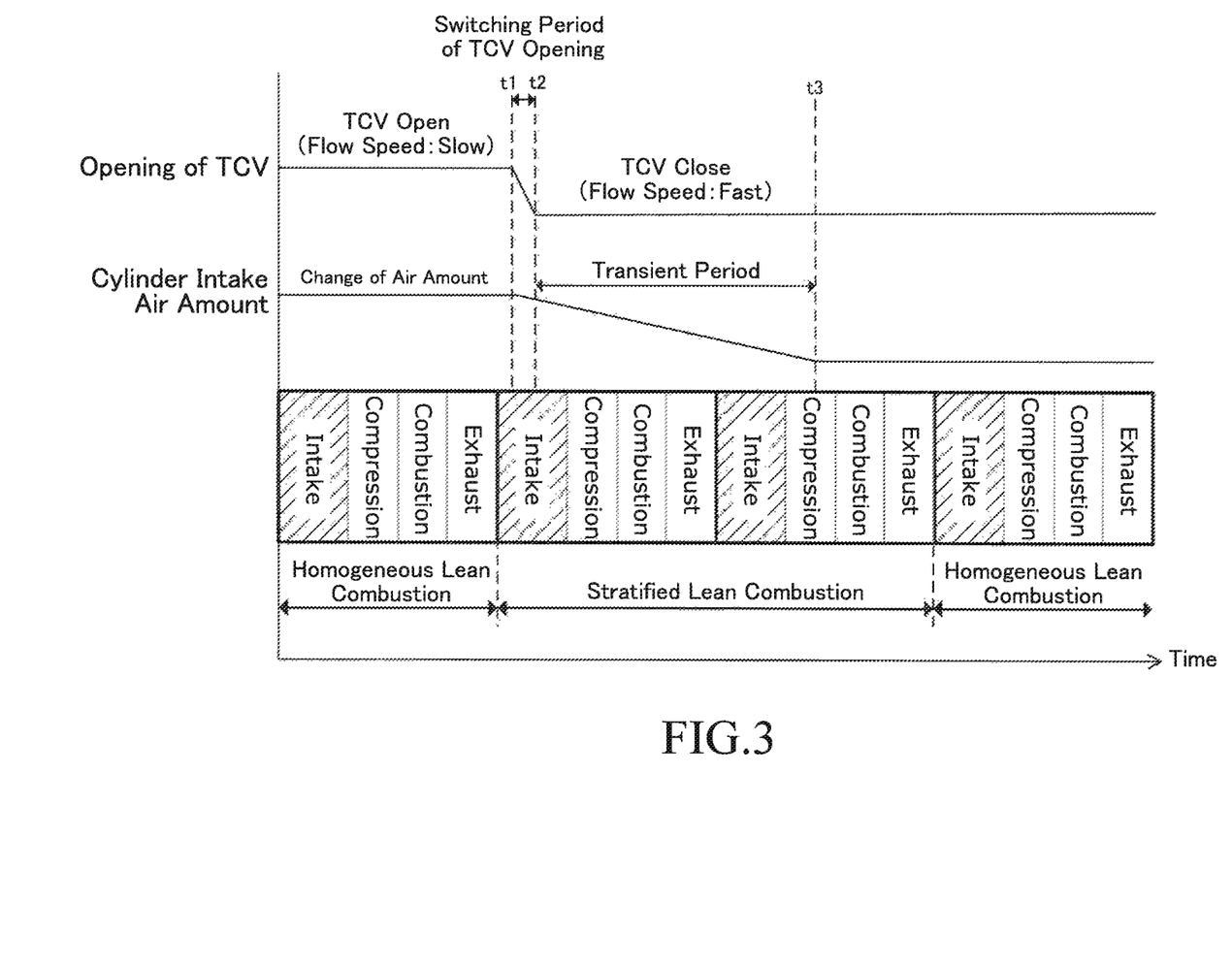
FIG. 3 is a timeline chart for explaining a combustion control executed by the first apparatus when the tumble control valve is switched.

In the case where the operational point of the engine 10 is in the operational region where the homogeneous lean combustion is achieved (i.e. in the case where the homogeneous lean combustion is achieved), when the first apparatus switches the opening of the TCV 44, if a "switching period" of the TCV 44 overlaps with all of or a part of a specific intake stroke of a specific cylinder (a period in which the intake valve 32 of the specific cylinder is open, i.e., a period when intake air flows into the specific cylinder), the stratified lean combustion is achieved in a specific combustion stroke of the specific cylinder in place of the homogeneous lean combustion. This control is referred to as a "combustion control" of the first apparatus. The specific intake stroke and the specific combustion stroke are within the same combustion cycle of the engine 10. That is, the specific combustion stroke follows the specific intake stroke. The "switching period" is a period from the beginning (time t1 in FIG. 3) to finishing (time t2 in FIG. 3) of change of the opening of the TCV 44 from either of the first opening and the second opening to the other.

More specifically, the first apparatus controls ignition timing of the spark plug 37, and a fuel injection amount Q and injection timing of the fuel injection valve 39. The first apparatus determines the fuel injection amount Q, which is a quantity of fuel injected from the fuel injection valve 39, based on the mass flow rate Ga, the engine rotational speed NE, etc, according to a well-known method. Further, the first apparatus makes the fuel injection valve 39 inject fuel whose quantity is equal to "the fuel injection amount Q" while the first apparatus controls the fuel injection timing θinj (=start timing of the fuel injection) which is a point in time when the fuel is injected. However, the first apparatus sets the fuel injection timing θinj within an intake stroke when the first apparatus achieves the homogeneous lean combustion. In addition, the first apparatus sets the fuel injection timing θinj within a compression stroke when the first apparatus achieves the stratified lean combustion. After the fuel injection by the fuel injection valve 39, the first apparatus makes the spark plug 37 generate a spark for ignition at the timing as close as possible to the MBT (Minimum advance for Best Torque) and makes the air-fuel mixture in the combustion chamber 25 burn. That is, when the homogeneous lean combustion is achieved, the first apparatus forms homogeneous air-fuel mixture by means of injecting fuel from the fuel injection valve 39 during an intake stroke and then burns the air-fuel mixture by means of igniting by the spark from the spark plug 37. When the stratified lean combustion is achieved, the first apparatus forms stratified air-fuel mixture by means of injecting fuel from the fuel injection valve 39 during a compression stroke and then burns the air-fuel mixture by means of igniting by the spark from the spark plug 37 "at a point in time when a portion of the air-fuel mixture whose fuel concentration is rich reaches the vicinity of the spark plug 37."

Even when the intake flow is unstable as a result of switching of the opening of the TCV 44, if the stratified lean combustion is achieved, because air-fuel mixture whose fuel concentration is rich in the vicinity of the spark plug 37 is formed, the ignition ability of the air-fuel mixture becomes excellent. Thereby, even if the intake flow is unstable during switching of the opening of the TCV 44, it is possible to make combustion stable. Thus, it is possible to decrease "the fluctuation of the torque TQ which is caused by switching of the opening of the TCV 44."

Further, if all of or a part of an other intake stroke (when the intake valve is open) of an other cylinder overlaps with a "transient period" from an end point in time of the switching period to a point in time at which amount of intake air flowing into the cylinders becomes stable, the first apparatus achieves the stratified lean combustion in place of the homogeneous lean combustion in an other combustion stroke which is a combustion stroke just behind the other intake stroke. That is, the other intake stroke and the other combustion stroke are within the same combustion cycle of the engine 10. The "transient period" is a period from a point in time (time t2 of FIG. 3) when switching of the opening of the TCV 44 is completed to a point in time (time t3 of FIG. 3) when amount of intake air flowing into the cylinders (cylinder intake air amount) becomes stable. When the cylinder intake air amount becomes stable, a magnitude of the change (variation, variability) of the quantity of intake air flowing into the cylinder becomes less.

As for the stratified lean combustion, because air-fuel mixture whose fuel concentration is rich around the spark plug 37 is formed, the ignition ability of the air-fuel mixture becomes excellent. Thereby, even if the cylinder intake air amount changes in the transient period, it is possible to make combustion of the air-fuel mixture stable. Thus, it is possible to suppress the fluctuation of the torque TQ during the transient period and a period following the transient period.

(Actual Combustion Control)

Figure 4:
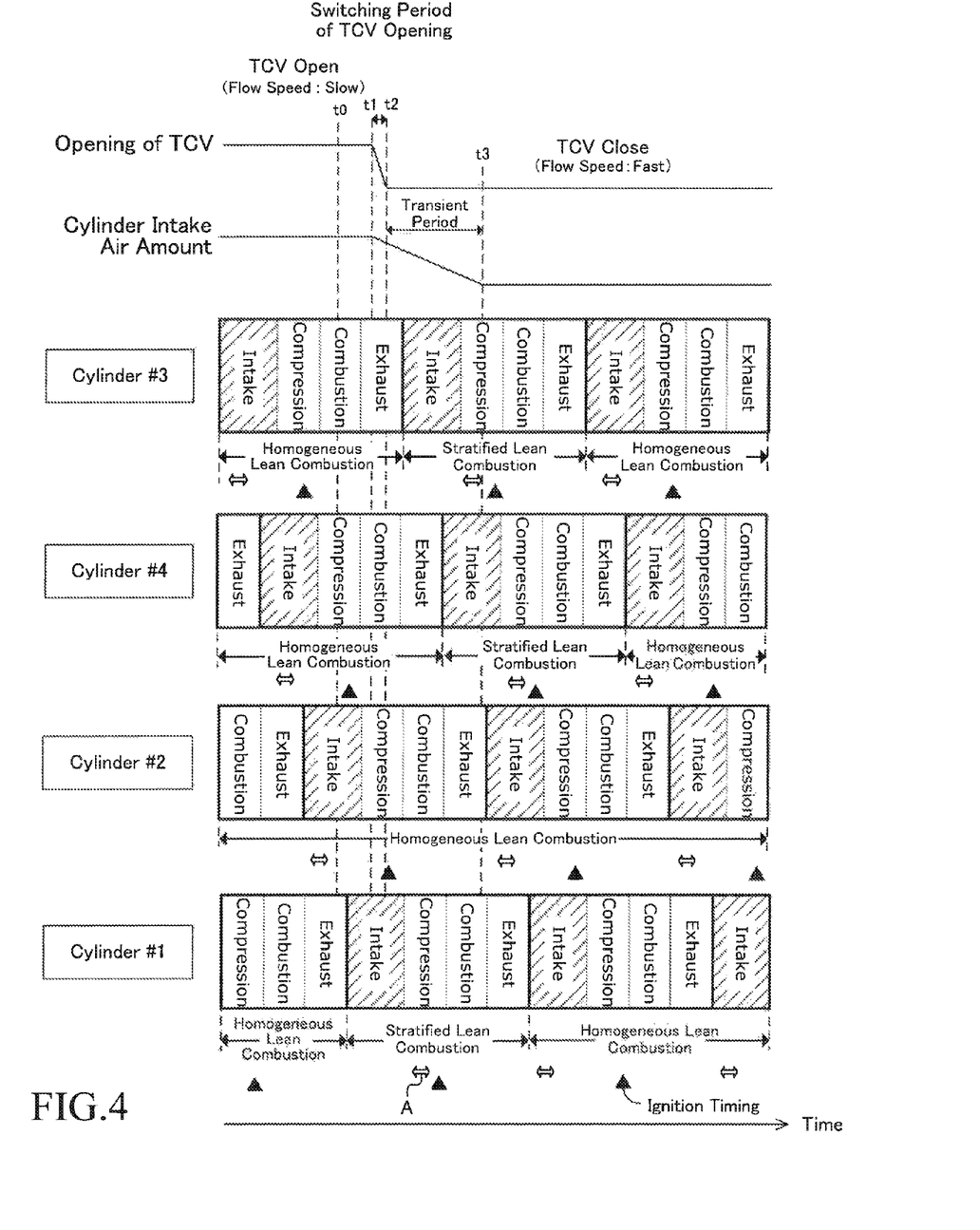
FIG. 4 is a timeline chart for explaining an operation of the first apparatus.

The combustion control which the electric controller 70 of the first apparatus actually executes will next be described with reference to a timeline chart of FIG. 4. Changes of "the opening of the TCV 44" and "the cylinder intake air amount" with respect to time in the case where the operational point of the engine 10 is in the operational region where the homogeneous lean combustion is achieved are shown in FIG. 4. In addition, combustion cycles of a first cylinder (cylinder #1) to a forth cylinder (cylinder #4) of the engine 10, which is the series four-cylinder engine, with respect to time are also shown in FIG. 4. An ignition order of the engine 10 is made to be #1-#3-#4-#2. Each of black triangles located under compression strokes represents ignition timing by the spark plug 37. Each of bidirectional arrows (white arrows) located under intake strokes or compression strokes represents a fuel injection period when fuel injection is executed by the fuel injection valve 39. The fuel injection valve 39 injects fuel during intake strokes when the homogeneous lean combustion is achieved. On the other hand, the fuel injection valve 39 injects fuel during compression strokes when the stratified lean combustion is achieved.

The timing of opening of the intake valve 32 is made to advance from the intake TDC (intake top dead center) and the timing of closing of the intake valve 32 is made to retard from the intake BDC (intake bottom dead center). Whereby, the duration of a intake stroke is longer than a duration correspond to 180° of the crank angle θ. As a result, a compression stroke of a certain cylinder overlaps with that of another cylinder. However, a compression stroke of each cylinder contains a period which does not overlap with that of other cylinders. In the case where the operational point of the engine 10 is in the operational region where the homogeneous lean combustion is achieved, when the operational point moves across line L1 or line L2 shown in the above-described FIG. 2, a request for switching of the opening of the TCV 44 occurs. In this case, the electric controller 70 execute switch of the opening of the TCV 44 when a single cylinder is in a intake stroke and the other three cylinders are not in intake strokes. That is, a period when the opening of the TCV 44 is changing overlaps with a intake stroke of only one cylinder. Switching of the opening of the TCV 44 causes the change of intake flow only in the cylinder whose intake stroke overlaps which the switching period. Whereby, the period of the switching of the opening of the TCV 44 is configured such that the period overlaps with a intake stroke of only one cylinder. As the result, it is possible to avoid that switching of the opening of the TCV 44 causes the change of intake flow in other cylinder than the cylinder whose intake stroke overlaps with the switching period.

On the combustion control which is executed in time with switching of the opening of the TCV 44, the combustion mode is switched to the stratified lean combustion. In order to do this, a fuel injection should be executed during a compression stroke. It should be noted that in the example of FIG. 4, the electric controller 70 decides to switch the opening of the TCV 44 before a intake stroke of the cylinder #1. In the example of FIG. 4, a request for switching of the opening of the TCV 44 occurs at time t0, and the cylinder #1 is the first cylinder which starts an intake stroke after time t0. Therefore, the electric controller 70 begins an operation of switching of the TCV opening (changing of the opening) at time t1 immediately after starting of a intake stroke of the cylinder #1. And then, in this example, the operation of switching of the TCV opening is finished at time t2 before an intake stroke of the cylinder #3 starts.

In order to achieve the stratified lean combustion in a combustion stroke of the cylinder #1 whose intake stroke overlaps with the operation to switch of the TCV opening and which corresponds to its intake stroke (i.e. the combustion stroke and the intake stroke are within the same combustion cycle), the electric controller 70 executes an fuel injection of the cylinder #1 in the compression stroke after the intake stroke (refer to the bidirectional arrow with symbol "A"). Specifically, the electric controller 70 executes the fuel injection in the compression stroke immediately after the overlap between the operation to switch of the TCV opening and the intake stroke, and before the combustion stroke where the stratified lean combustion is achieved (i.e. these intake stroke, compression stroke and combustion stroke are correspond to the same combustion cycle). As a result stratified lean air-fuel mixture is formed in the cylinder #1.

To be more specific, the electric controller 70 calculates a fuel injection amount Q based on an estimated cylinder air amount which is separately estimated and a target lean air-fuel ratio. The electric controller 70 injects fuel equal to the fuel injection amount Q in the compression stroke of the cylinder #1.

Incidentally, there is a time lag between a change of the opening of the TCV 44 and a change of actual intake air amount (cylinder air amount) which flows into a cylinder. Whereby, the cylinder air amount changes transiently for a while after changing of the opening of the TCV 44. Thus, it is difficult to accurately calculate the fuel injection amount Q according to intake air amount actually flowing into a cylinder. As a result, combustion may become unstable.

Figure 5:
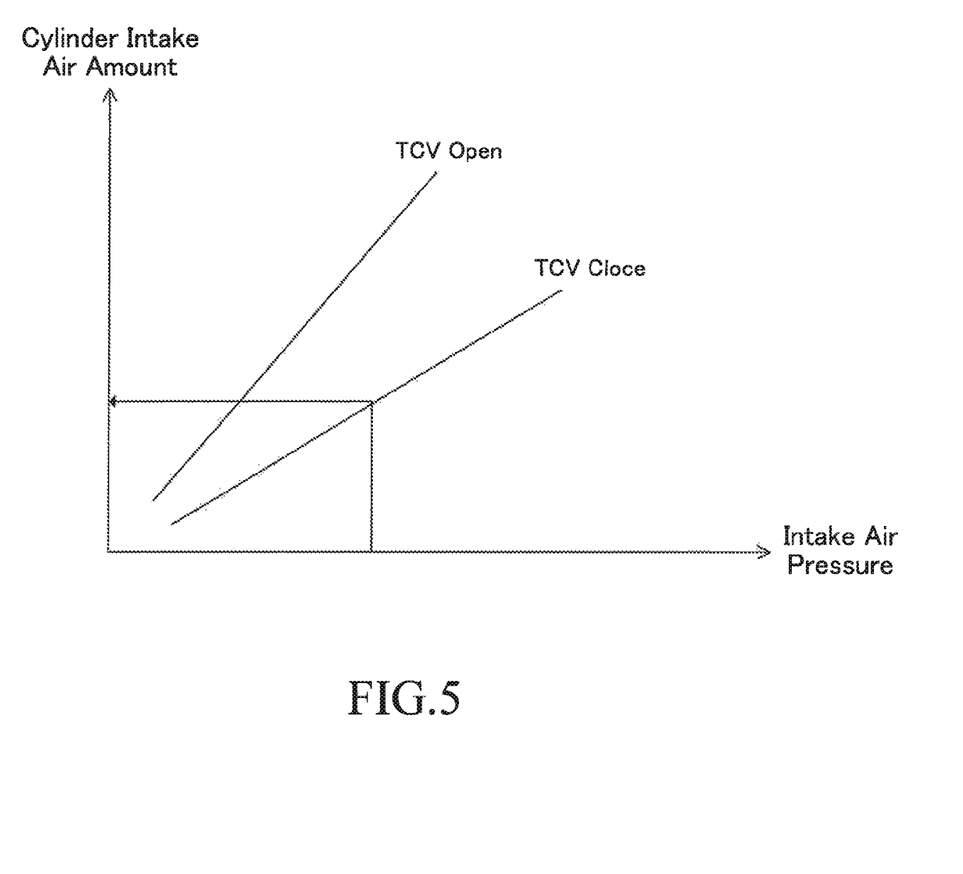
FIG. 5 is a graph for explaining an air model of the first apparatus which estimates intake air amount.

On the other hand, the "estimated cylinder air amount", which is estimated air amount of actual flowing into a cylinder, is calculated based on an air-model. Because the air-model is well-known, a brief overview will be described about that here. Estimated intake air pressure of a space positioned downstream of the throttle valve 43 and upstream of the TCV 44 is firstly calculated utilizing a throttle model in which the throttle valve 43 is modeled. And then, the estimated cylinder air amount is calculated utilizing the linear relationship between intake air pressure and cylinder air amount per the opening of the TCV 44 shown in FIG. 5. However, because of delay in response of actual cylinder air amount to change of the opening of the TCV 44, when the estimated cylinder air amount is calculated after switching of the opening of the TCV 44, a process such as annealing processing to suppress rapid change of the estimated cylinder air amount is executed.

The estimated cylinder air amount calculated based on the above-described method contains estimation error during transient change of cylinder air amount. The estimation error occurs during a period from switching of the opening of the TCV 44 to the transient change of cylinder air amount. In view of this, in the case where the combustion control is executed, the electric controller 70 also achieves the stratified lean combustion during the transient change of cylinder air amount as well as switching of the opening of the TCV 44 so as to avoid combustion deterioration because of the estimation error of the cylinder air amount. That is, the stratified lean combustion is achieved during a period from the beging of switching of the opening of the TCV 44 to a point in time when actual cylinder air amount becomes stable.

In the example shown in FIG. 4, intake strokes of the cylinder #3 and the cylinder #4 begin during a period from the finishing of switching of the opening of the TCV 44 to a point in time when cylinder air amount becomes stable (time t3). Change of intake flow into cylinder caused by switching of the opening of TCV 44 exerts influence on combustion in the cylinder #1. Change of actual cylinder air amount during the transient period after the finish of switching exerts influence on combustion in the cylinder #3 and cylinder #4. In view of this, the electric controller 70 achieves the stratified lean combustion in the cylinder #3 and cylinder #4 as well as the cylinder #1.

(Specific Operation of First Apparatus)

Next, specific operation of the electric controller 70 will be described.

The CPU 71 of the electric controller 70 executes a combustion control routine represented by the flowchart of FIG. 6 every time a predetermined period of time elapses. Accordingly, when a proper timing comes, the CPU 71 starts the processing from step 100 of FIG. 6 and proceeds to step 102 so as to judge whether or not the engine 10 achieves the homogeneous lean combustion. That is, the CPU 71 judges whether or not the operational point of the engine 10 is in the "region where the homogeneous lean combustion is achieved (i.e. region on the lower torque side from line L3)" shown in FIG. 2. If the operational point of the engine 10 is not in the "region to achieve the homogeneous lean combustion" in this time, the CPU 71 makes a negative judgment (No) in step 102 and directly proceeds to step 114 and ends the present routine.

In the case where the CPU 71 makes an affirmative judgment (Yes) in step 102 (i.e. in the case where the operational point of the engine 10 is in the region to achieve the homogeneous lean combustion), the CPU 71 proceeds from step 102 to step 104 so as to judge whether or not the request for switching of the opening of the TCV 44 occurs. That is, the CPU 71 judges whether or not the operational point of the engine 10 has traversed either line L1 or line L2 shown in FIG. 2. Unless the operational point of the engine 10 has moved across either line L1 or line L2 shown in FIG. 2 in this time, the CPU 71 makes a negative judgment (No) in step 104 and directly proceeds to step 114 and ends the present routine.

In the case where the CPU 71 makes an affirmative judgment (Yes) in step 104 (i.e. in the case where the operational point of the engine 10 has moved across either line L1 or line L2 shown in FIG. 2), the CPU 71 proceeds from step 104 to step 106 so as to execute switching of the opening of the TCV 44 during a "specific period." The "specific period" is within a specific intake stroke of a specific cylinder which does not overlap with other cylinders' intake stroke than the specific cylinder. The specific intake stroke is the first intake stroke which starts after the affirmative judgment (Yes) in step 104. The specific cylinder is a cylinder which corresponds to the specific intake stroke. Specifically, the CPU 71 makes the valve shaft rotate by means of driving the DC motor of the TCV drive means so as to switch the opening of the TCV 44.

After the processing of step 106, the CPU 71 proceeds to step 108 so as to determine the fuel injection timing θinj and the fuel injection amount Q as described above such that the stratified lean combustion is achieved. The CPU 71 executes fuel injections by executing an unillustrated routine separately according to the fuel injection timing θinj and the fuel injection amount Q.

After the processing of step 108, the CPU 71 proceeds to step 110 so as to judge whether or not a first predetermined period has elapsed after the processing of step 106. The first predetermined period is the sum of the period of switching of the opening of the TCV 44 and the transient period. If the first predetermined period has not elapsed in this time, the CPU 71 makes a negative judgment (No) in step 110 and proceeds to step 108 so as to execute the processing of step 108 again. As a result, the stratified lean combustion is achieved in the cylinders whose intake strokes overlap with the first predetermined period partially or completely.

In the case where the CPU 71 makes an affirmative judgment (Yes) in step 110 (i.e. in the case where the first predetermined period has elapsed after the processing of step 106), the CPU 71 proceeds to step 112 so as to determine the fuel injection timing θinj and the fuel injection amount Q as described above such that the homogeneous lean combustion is achieved. After the processing of step 112, the CPU 71 proceeds to step 114 and ends the present routine.

According to the above-described processing, in the case where the operational point of the engine 10 is in the operational region where the homogeneous lean combustion is achieved, the stratified lean combustion in place of the homogeneous lean combustion is achieved in combustion strokes of the cylinders whose intake strokes overlaps with switching of the opening of the TCV 44. This intake stroke and this combustion stroke are within the same combustion cycle of the engine 10. Thereby, because air-fuel mixture whose fuel concentration is richer in the vicinity of the spark plug 37 is formed in comparison with a case of the homogeneous lean combustion, the ignition ability of the air-fuel mixture becomes excellent. As a result, because combustion may not become unstable, it is possible to suppress the fluctuation of the torque TQ.

Further, the stratified lean combustion in place of the homogeneous lean combustion is achieved in combustion strokes of the cylinders whose intake strokes overlaps with the transient period from a point in time when switching of the opening of the TCV 44 is completed to a point in time when amount of intake air flowing into the cylinder becomes stable. This intake stroke and this combustion stroke are within the same combustion cycle of the engine 10. Thereby, because air-fuel mixture whose fuel concentration is richer in the vicinity of the spark plug 37 is formed in comparison with a case of the homogeneous lean combustion, even though the fuel injection amount is not proper due to the estimation error of the cylinder air amount, the ignition ability of the air-fuel mixture becomes excellent. As a result, because combustion may not become unstable, it is possible to suppress the fluctuation of the torque TQ.

It should be noted that the first apparatus can be applied to a single-cylinder engine, series three-cylinder engine, v6 engine, etc. as well as the series four-cylinder engine.

Second Embodiment

An control apparatus (hereinafter, simply referred to as a "second apparatus") according to the second embodiment of the present disclosure executes the combustion control in a cylinder where combustion deterioration occurs (hereinafter, referred to as a "combustion deterioration cylinder"). More specifically, if all of or a part of a certain intake stroke of the combustion deterioration cylinder overlaps with the above-described transient period, the second apparatus achieves the stratified lean combustion in place of the homogeneous lean combustion in a combustion stroke just behind the intake stroke (i.e. the intake stroke and the combustion stroke belong to the same combustion cycle.).

The above-described first apparatus achieves the stratified lean combustion in place of the homogeneous lean combustion in combustion strokes of the cylinders whose intake strokes overlaps partially or completely with the transient period from a point in time when switching of the opening of the TCV 44 is completed to a point in time when amount of intake air flowing into the cylinder becomes stable. On the other hand, the second apparatus does not achieve the stratified lean combustion in combustion stroke of the cylinders whose intake stroke overlaps partially or completely with the transient period, if the cylinders are not combustion deterioration cylinders. Therefore, because the second apparatus achieves the homogeneous lean combustion in a cylinder having low possibility to occur combustion deterioration, it is possible for the second apparatus to increase opportunities to achieve the homogeneous lean combustion while suppressing the fluctuation of the torque TQ.

(Combustion Control According to Second Apparatus)

Hereinafter, as for combustion control, the difference between the first apparatus and the second apparatus will be mainly described. The second apparatus identifies the combustion deterioration cylinder before switching of the opening of the TCV 44. Further, if all of or a part of a certain intake stroke (overlapped intake stroke) of the identified combustion deterioration cylinder overlaps with the above-described first predetermined period, the second apparatus achieves the stratified lean combustion in place of the homogeneous lean combustion in the combustion stroke of the identified combustion deterioration cylinder in the same combustion cycle as the overlapped intake stroke. On the other hand, if a cylinder of a certain intake stroke which partially or completely overlaps with the first predetermined period is not the combustion deterioration cylinder, the second apparatus achieves the homogeneous lean combustion without achieving the stratified lean combustion. Thus, the second apparatus identifies the combustion deterioration cylinder before switching of the opening of the TCV 44, when the operational point of the engine 10 is in the operational region where the homogeneous lean combustion is achieved.

It should be noted that when the operational point is in the operational region where the homogeneous lean combustion is achieved and the opening of the TCV 44 is switched, if all of or a part of a certain intake stroke (i.e. a period when the intake valve 32 is open and intake air flows into the cylinder) overlaps with the switching period, the second apparatus may achieve the stratified lean combustion in place of the homogeneous lean combustion in the combustion stroke of the cylinder in the same combustion cycle, regardless of whether the cylinder is the combustion deterioration cylinder or not, in common with the first apparatus.

(Method for Identification of Combustion Deterioration Cylinder)

The second apparatus identifies the combustion deterioration cylinder by means of processing of the signals from the cylinder pressure sensors 67. Specifically, the second apparatus calculate combustion mass rates per the crank angle θ based of the signals from the cylinder pressure sensors 67. In addition, the second apparatus obtains a length of a period from a point in time of ignition to a point in time when the combustion mass rate becomes a predetermined rate (e.g. 10%). The length of the period is a parameter which represents combustion speed. More specifically, the second apparatus calculates the parameter which represents combustion speed per cylinder for plural cycles. If a variation of the combustion speed represented by the parameter between cycles (combustion speed variability rate) according to a certain cylinder is large, the combustion status of its cylinder is deteriorated. On the other hand, if the combustion speed variability rate of another cylinder is low, the combustion status of its cylinder is stable. That is, the combustion speed variability rate represents a degree of the combustion deterioration. Thus, it is possible to comparatively judge the combustion state of each cylinder based on the combustion speed variability rate per cylinder. In view of this, the second apparatus obtains the combustion speed variability rate per cylinder for plural combustion cycles. The second apparatus determines (identifies) a cylinder whose combustion speed variability rate is greater than a predetermined threshold as a combustion deterioration cylinder.

(Specific Operation of Second Apparatus)

Next, specific operation of the second apparatus will be described.

The CPU 71 with which the electric controller 70 of the second apparatus is provided executes a combustion control routine represented by the flowchart of FIG. 7 every time a predetermined period of time elapses. Here, a processing executed by the CPU 71 when the operational point of the engine 10 is in the region where the homogeneous lean combustion is achieved and it is determined that a combustion deterioration cylinder exists before switching of the opening of the TCV 44 is described.

At the beginning, the CPU 71 starts the processing from step 100 and proceeds to the above-described step 102. When the CPU 71 makes an affirmative judgment (Yes) in step 102, the CPU 71 proceeds to step 116 so as to identify a combustion deterioration cylinder based on the above-described method for the identification of a combustion deterioration cylinder.

After the processing in step 116, the CPU 74 executes processing of step 104 through 108. As a result of these processing, the CPU 71 switches the opening of the TCV 44 and achieves the stratified lean combustion in combustion stroke of a cylinder whose intake stroke partially or completely overlaps with the switching period, the intake stroke and the combustion stroke being in the same combustion cycle.

After the processing in step 108, the CPU 71 proceeds to step 118 so as to judge whether or not a second predetermined period has elapsed after the processing of step 106. The second predetermined period is equivalent to the period of switching of the opening of the TCV 44. If the second predetermined period has not elapsed in this time, the CPU 71 makes a negative judgment (No) in step 118 and proceeds to step 108 so as to execute the processing of step 108 again.

In the case where the CPU 71 makes an affirmative judgment (Yes) in step 118 (i.e. in the case where the second predetermined period has elapsed after the processing of step 106), the CPU 71 proceeds to step 120 so as to determine the presence or absence of a combustion deterioration cylinder.

In the case where the CPU 71 makes an affirmative judgment (Yes) in step 120 (i.e. in the case where a combustion deterioration cylinder exists), the CPU 71 proceeds to step 122 so as to determine the fuel injection timing θinj and the fuel injection amount Q as described above such that the stratified lean combustion is achieved in the combustion deterioration cylinder.

However, as for cylinders other than the combustion deterioration cylinder (normal combustion cylinders), the CPU 71 achieves the homogeneous lean combustion in this time. That is, the CPU 71 determines the fuel injection timing θinj and the fuel injection amount Q such that the homogeneous lean combustion is achieved in the normal combustion cylinders.

After the processing of step 122, the CPU 71 proceeds to step 124 so as to judge whether or not a third predetermined period has elapsed after the processing of step 106. The third predetermined period is the sum of the period of switching of the opening of the TCV 44 (i.e. the second predetermined period) and the transient period. If the third predetermined period has not elapsed in this time, the CPU 71 makes a negative judgment (No) in step 124 and proceeds to step 122 so as to execute the processing of step 122 again.

In the case where the CPU 71 makes an affirmative judgment (Yes) in step 124 (i.e. in the case where the third predetermined period has elapsed after the processing of step 106), the CPU 71 proceeds to step 126 so as to determine the fuel injection timing θinj and the fuel injection amount Q as described above such that the homogeneous lean combustion is achieved in all of the cylinders.

Next, a processing executed by the CPU 71 when the operational point of the engine 10 is in the region where the homogeneous lean combustion is achieved and it is determined that a combustion deterioration cylinder does not exist before switching of the opening of the TCV 44 is described.

In this case, the CPU 71 makes a negative judgment (No) in step 120. Then, the CPU 71 directly proceeds from step 120 to step 126. Thereby, the CPU 71 determines the fuel injection timing θinj and the fuel injection amount Q such that the homogeneous lean combustion is achieved in all of the cylinders.

Thus, by means of identifying a combustion deterioration cylinder before switching of the opening of the TCV 44, it is possible to identify a cylinder in which combustion becomes unstable after switching of the opening of the TCV 44 due to a transient change of the cylinder intake air amount (unstable combustion cylinder). Further, by means of achieving the stratified lean combustion in the identified unstable combustion cylinder, the unstable combustion unlikely to occur. As a result, combustion becomes stable and the fluctuation of the torque TQ is suppressed. In addition, it is possible to enlarge the operational region where the homogeneous lean combustion is achieved while the operational region where the stratified lean combustion is minimally limited.

It should be noted that the second apparatus calculate the combustion mass rates per the crank angle θ based of the signals from the cylinder pressure sensors 67 and identify a combustion deterioration cylinder based on the combustion mass rates, but method to identify a combustion deterioration cylinder is not especially limited. For example, it is determined that the longer combustion period is, the worse combustion status is. Thereby, the second apparatus may calculate the combustion period based of the signals from the cylinder pressure sensors 67 and identify a cylinder whose combustion period is longer than a predetermined threshold as a combustion deterioration cylinder.

As described above, according to the first control apparatuses and the second control apparatus (i.e. the present control apparatus), it is becomes possible to avoid the combustion deterioration while the opening of the TCV 44 is switched, when the operational point is in the operational region where the homogeneous lean combustion is achieved. As a result, it is becomes possible to suppress the fluctuation of the torque TQ.

Although the embodiments of the present disclosure have been described, the present disclosure is not limited to the above-described embodiments and may be changed in various ways without departing from the scope of the present disclosure. For example, the present control apparatuses are applied to the engine 10 which is provided with the tumble control valve (TCV 44). However, the present control apparatuses may be applied to an engine which is provided with a swirl control valve.

Further, all of the TCVs 44 are positioned on the single valve shaft and the single valve shaft is rotated by the common DC motor. However, each of the TCVs 44 (or swirl control valves) may be driven by individual DC motors respectively.

Further, the present control apparatuses executes switching of the opening of the TCV 44 such that switching of the opening of the TCV 44 overlaps with a intake stroke of a single cylinder of the engine 10. However, the present control apparatuses may execute switching of the opening of the TCV 44 such that switching of the opening of the TCV 44 overlaps with intake strokes of plural cylinders of the engine 10.

Further, the present control apparatuses achieves the stratified lean combustion from the beginning of switching of the opening of the TCV 44 to a point in time when actual cylinder air amount becomes stable. However, the present control apparatuses may achieve the stratified lean combustion in place of the homogeneous lean combustion for a period equivalent to the sum of the period of switching of the opening of the TCV 44 and predetermined number of cycles of the engine 10.

Further, the present control apparatuses are applied to the engine 10 which is provided with the fuel injection valve 39 (i.e. cylinder injection valve). However, the present control apparatuses may be applied to an engine which is provided with both a cylinder injection valve and a port injection valve. In this case, the homogeneous lean combustion may be achieved by means of fuel injection during intake strokes utilizing only the port injection valve, or both the cylinder injection valve and the port injection valve.

The invention claimed is:

1. A control apparatus for an internal combustion engine, applied to a spark ignition internal combustion engine having an air flow control valve which changes intake air flow generated in a cylinder of said internal combustion engine by means of changing an opening thereof, comprising:

an opening control section which sets said opening of said air flow control valve to either a first opening or a second opening selectively; and a combustion control section which controls said internal combustion engine so as to burn air-fuel mixture in said cylinder in either a homogeneous lean combustion mode or a stratified lean combustion mode, selectively; wherein, said combustion control section is configured to:

burn said air-fuel mixture in said homogeneous lean combustion mode when an operational point of said internal combustion engine is in an operational region where a homogeneous lean combustion is to be achieved; and burn said air-fuel mixture in said stratified lean combustion mode, in place of said homogeneous lean combustion mode, in a first specific combustion stroke of a first specific cylinder, when said opening control section switches said opening of said air flow control valve from said first opening to said second opening while said operational point is in said operational region, all of or a part of a first specific intake stroke which is a period in which an intake valve of said first specific cylinder is open overlapping with a switching period from a point in time at which said opening of said air flow control valve starts to change from said first opening to said second opening to a point in time at which said opening of said air flow control valve reaches said second opening, and said first specific combustion stroke following said first specific intake stroke of said first specific cylinder.

2. The control apparatus for an internal combustion engine according to claim 1, wherein, said combustion control section is configured to burn said air-fuel mixture in said stratified lean combustion mode, in place of said homogeneous lean combustion mode, in a second specific combustion stroke of a second specific cylinder, if all of or a part of a second specific intake stroke which is a period in which an intake valve of said second specific cylinder is open overlaps with a transient period from an end point in time of said switching period to a point in time at which an amount of intake air flowing into said engine become stable while said operational point is in said operational region, said second specific combustion stroke following said second specific intake stroke of said second specific cylinder.

3. The control apparatus for an internal combustion engine according to claim 1, wherein, said internal combustion engine is a multi-cylinder internal combustion engine having a plurality of cylinders, and comprises a plurality of cylinder pressure sensors each of which corresponds to each of said cylinders and detects an in-cylinder pressure of each of said cylinders;

said control apparatus further comprises a cylinder identification section which identifies a cylinder of said internal combustion engine whose combustion state has become deteriorating as an combustion deterioration cylinder based on said in-cylinder pressure detected by said cylinder pressure sensors; and said combustion control section is configured to burn said air-fuel mixture in said stratified lean combustion mode, in place of said homogeneous lean combustion mode, in a third specific combustion stroke of a third specific cylinder which is said combustion deterioration cylinder identified by said cylinder identification section, if all of or a part of a third specific intake stroke which is a period in which an intake valve of said third specific cylinder is open overlaps with a transient period from an end point in time of said switching period to a point in time at which an amount of intake air flowing into said engine become stable while said operational point is in said operational region, and said third specific combustion stroke following said third specific intake stroke of said third specific cylinder.

* * * * *